UNITED STATES PATENT OFFICE.

OTTO BONHOEFFER AND HEINRICH DRESER, OF ELBERFELD, GERMANY, ASSIGNORS TO THE FARBENFABRIKEN OF ELBERFELD COMPANY, OF NEW YORK.

METHYLPROPYLCARBINOLURETHANE AND METHOD OF MAKING SAME.

SPECIFICATION forming part of Letters Patent No. 659,202, dated October 9, 1900.

Application filed October 17, 1899. Serial No. 733,913. (Specimens.)

*To all whom it may concern:*

Be it known that we, OTTO BONHOEFFER, doctor of philosophy and chemist, and HEINRICH DRESER, doctor of medicine, professor of pharmacology, of Elberfeld, Germany, (assignors to the FARBENFABRIKEN OF ELBERFELD COMPANY, of New York,) have invented a new and useful Improvement in the Manufacture of Pharmaceutical Compounds, of which the following is a specification.

Our invention relates to the preparation of a new pharmaceutical product, which is chemically methylpropylcarbinolurethane or carbonic ether of methylpropylcarbinol, having the formula

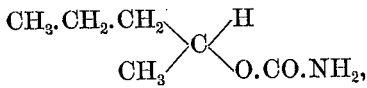

and which, according to our researches, possesses valuable therapeutic, especially soporific, properties.

The process for producing our new compound consists in allowing urea or salts thereof to act on methylpropylcarbinol in a suitable manner.

In order to carry out our process practically, we can, for instance, proceed as follows: Twenty parts, by weight, of methylpropylcarbinol are mixed with twenty-eight parts, by weight, of urea nitrate, and the resulting mixture is heated in a closed vessel under pressure for, say, five hours at from about 125° to 130° centigrade. After cooling a small quantity of water is added to the mass. The oily liquid thus separated is isolated from the watery solution. After standing for some time the oil solidifies in the shape of needles. By a subsequent crystallization from ligroine the new methylpropylcarbinolurethane is obtained in the shape of thin white needles melting at 74° centigrade. It readily dissolves in alcohol, benzene, toluene, ether, and carbon tetrachloride, and is also soluble in water.

According to our investigations the new compound possesses valuable therapeutical properties and can be used in medicine as a soporific, an average dose being between two and three grams.

Having now described our invention and in what manner the same is to be performed, what we claim as new, and desire to secure by Letters Patent, is—

1. The process for the production of methylpropylcarbinolurethane which process consists in allowing urea salts to act on methylpropylcarbinol, isolating the so-formed methylpropylcarbinolurethane and subsequently purifying the same.

2. As a new article of manufacture the methylpropylcarbinolurethane having the formula:

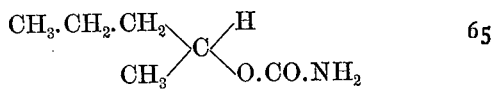

forming when crystallized from ligroine thin white needles melting at 74° centigrade, being readily soluble in alcohol, benzene, toluene, ether, carbon tetrachloride, also soluble in water, and adapted for being used in medicine as soporific.

In testimony whereof we have signed our names in the presence of two subscribing witnesses.

OTTO BONHOEFFER.
HEINRICH DRESER.

Witnesses:
OTTO KÖNIG,
R. E. JAHN.